United States Patent [19]

Kramer, Sr. et al.

[11] 4,360,493
[45] Nov. 23, 1982

[54] FLEXIBLE CORRUGATED RUBBER TUBING OF DUAL COMPOSITION

[76] Inventors: Vance M. Kramer, Sr., 2341 Townley Rd., Toledo, Ohio 43614; Vance M. Kramer, Jr., 1913 Greendale Ave., Findlay, Ohio 45840

[21] Appl. No.: 281,867

[22] Filed: Jul. 9, 1981

[51] Int. Cl.³ .................... B29D 23/03; B29C 17/04
[52] U.S. Cl. .................... 264/506; 264/292; 264/295; 264/320; 264/507
[58] Field of Search ............ 264/506, 507, 292, 295, 264/320

[56] References Cited

U.S. PATENT DOCUMENTS

| | | | |
|---|---|---|---|
| 2,832,096 | 4/1958 | Kramer et al. | 18/45 |
| 2,879,953 | 3/1959 | Kramer et al. | 242/54 |
| 2,888,712 | 6/1959 | Kramer et al. | 18/19 |
| 2,909,198 | 10/1959 | Kramer et al. | 138/49 |
| 3,155,757 | 11/1964 | Kramer et al. | 264/286 |
| 3,168,604 | 2/1965 | Kramer et al. | 264/100 |
| 3,304,581 | 2/1967 | Kramer et al. | 18/45 |
| 3,635,255 | 1/1972 | Kramer | 138/122 |
| 3,669,586 | 6/1972 | Kramer | 425/109 |
| 3,705,780 | 12/1972 | Kramer et al. | 425/389 |
| 3,809,522 | 5/1974 | Kramer | 425/387 |
| 3,975,129 | 8/1976 | Kramer | 425/387 B |
| 4,053,275 | 10/1977 | Kramer et al. | 425/389 |
| 4,158,033 | 6/1979 | Stefano et al. | 264/506 |

*Primary Examiner*—Maurice J. Welsh
*Attorney, Agent, or Firm*—Pearne, Gordon, Sessions, McCoy & Granger

[57] ABSTRACT

A method for making flexible, corrugated rubber tubing of dual composition from two extruded sleeves of uncured rubber. The inner diameter of one of the sleeves is approximately equal to the outer diameter of the other sleeve. The first sleeve is slid axially onto an elongated internal forming member, after which the second sleeve is slid over the first sleeve. An external forming means is then placed around the assembled sleeve and used to form corrugations in the pair of sleeves simultaneously, and thus intermittently interlock the two sleeves in a preshaped condition to form a unitary corrugated product. The resulting product is then heat-treated to set the corrugations and form a flexible corrugated tube length of dual composition.

17 Claims, 6 Drawing Figures

FLEXIBLE CORRUGATED RUBBER TUBING OF DUAL COMPOSITION

BACKGROUND OF THE INVENTION

This invention relates to corrugated, flexible tubing, especially rubber tubing, including both the helically corrugated type of rubber tubing made using the "cording" method and apparatus disclosed in U.S. Pat. Nos. 2,832,096; 2,879,953; 2,888,712; 2,909,198; 3,155,757; and 3,635,255; and in pending U.S. application Ser. No. 87,512 now abandoned, and also the type of helically or annularly corrugated tubing made using the axially extensible forming member method and apparatus of U.S. Pat. Nos. 3,168,604; 3,304,581; 3,669,586; 3,705,780; 3,809,522; 3,975,129; 4,053,275; 4,133,828; and pending U.S. patent application Ser. No. 87,512. More particularly, the invention relates to a novel variation of the type of corrugated tubular product that may be made using the basic concepts of the methods and apparatus referred to above, and especially to a novel corrugated, tubular rubber product that has unique properties particularly suitable in special applications where prior art tubing has been found to have deficiencies.

Flexible, helically or annularly corrugated rubber tubing of the type described is formed of an extruded sleeve of vulcanizable material which, when cured, provides a homogeneous, flexible, resilient wall structure that often requires a discrete set of properties. These properties are selected to provide the desired characteristics for the particular application. Typical properties are flexibility, hardness, resistance to oxidation and corrosion, tensile strength, arcing resistance, etc.

In some applications, the desired combinations of properties cannot be obtained with a single available vulcanizable composition and the requirements cannot be satisfied by tubing available from the above-recited prior art. For example, in a typical application—namely, vacuum cleaner hose—it is desirable that the interior portion of the hose have a high static conductivity and that the exterior portion be non-marking. These properties are inconsistent, since compositions with a high static conductivity tend not to resist arcing, and compositions that are non-marking have a low static conductivity.

In another typical special application—namely, marine fill hose—it is desirable that the interior portion of the hose gave good oil resistance and that the exterior portion have a high ozone resistance. Here again, these properties are inconsistent, since available compositions with good oil resistance have generally poor ozone resistance, whereas, compositions with good ozone resistance have generally poor oil resistance.

As indicated above, in the past corrugated, flexible tubing has been made using both the "cording" method and the "axially extensible form" method, both methods being described in detail in the aforementioned patents and pending application. Helically corrugated tubing made according to the "cording" method is made by first drawing an extruded sleeve of uncured rubber axially over an elongated, rotatable mandrel with a cord strip wrapped around it to form a single, continuous, external thread. The uncured rubber sleeve is forced into the helical groove or root of the thread by a length of cord wrapped around the sleeve to impart a desired corrugated shape. The rubber sleeve is cured in this condition and the cord removed. After curing, the resulting hose length may be removed from the mandrel and the core strip in a number of ways, such as by being blown off by air pressure from within the mandrel as described in U.S. Pat. 2,888,712.

The resulting helically corrugated hose length is both flexible and strong, yet still maintains its tubular form in a semirigid condition. This type of hose has particular application for use in domestic and industrial vacuum cleaners, as engine exhaust tubing, or tubing for ventilation systems, as well as in other appropriate applications.

Flexible corrugated tubing of the type of which the present invention is directed may also be produced using the "axially extensible form" method, as indicated above. In accordance with this method, external forming devices having axially spaced annular discs or helical convolutions are employed with forming mandrels to produce embryonic corrugations in uncured rubber sleeves. Each time a tube is formed, the forming member is placed over the forming mandrel on which the uncured rubber sleeve has been positioned and the sleeve is radially expanded with air pressure from within so that it bulges into the spaces between the discs or helical convolutions, thus forming creases between the bulges. The external forming member and sleeve are then collapsed axially so that the sleeve is axially compressed concertina fashion. The creases, together with adjacent bulges, provide embryonic corrugations. Then the forming member is axially extended together with the sleeve, after which the sleeve is removed from the forming mandrel and placed on a cylindrical curing mandrel, where it is axially foreshortened, concertina fashion, into corrugated form with the desired spacing between adjacent annular or helical corrugations.

According to a new variation of the above-described "cording" method, as described in pending U.S. patent application Ser. No. 87,512, two helically corrugated tube lengths of different diameter may be formed simultaneously by placing one uncured rubber sleeve on top of the other before the forming operation. According to that method, a parting component or lubricant must be generously applied to the inner sleeve before the outer sleeve is telescoped over it in order to facilitate removal of the two sleeves from one another.

In any event, none of the above-described methods up to now produces a product that satisfies the unique problems described above, wherein certain desired properties for special applications cannot be obtained since often the properties are inconsistent with one another.

The method and product of the present invention, however, resolve the difficulties indicated above and afford other features and advantages heretofore not obtainable.

SUMMARY OF THE INVENTION

It is among the objects of the present invention to improve the range of desired properties and characteristics that can be obtained with flexible, corrugated rubber tubing made in accordance with the prior art "cording" method or the prior art "axially extensible external form" method.

Another object of the invention is to produce flexible, helically or annularly corrugated rubber tubing having an interior surface composition with one set of properties and characteristics and an exterior surface composition having a different set of properties and characteristics. In accordance with the invention, a flexible, helically or annularly corrugated length of tubing having a dual composition is produced, using two extruded sleeves of uncured rubber, including a first sleeve of somewhat smaller diameter and a second sleeve of somewhat larger diameter and having an inner diameter approximately the same as the outer diameter of the first sleeve. In accordance with the method of the invention, the first sleeve is positioned over an elongated, internal forming member by sliding the first sleeve over it in an axial direction. The second sleeve of uncured rubber is then positioned over the first sleeve by sliding the second sleeve over the first sleeve in an axial direction. Then, an external corrugation forming means is positioned around the superposed sleeves and is used to form embryonic corrugations in the superposed sleeve, thereby intimately interlocking the sleeves together to form a corrugated, tubular element of dual composition. The resulting dual composition product is then heat-treated to set the corrugations and form a flexible, corrugated tube length of dual composition to satisfy special application requirements.

DESCRIPTION OF THE PREFERRED EMBODIMENT

Figure 1:
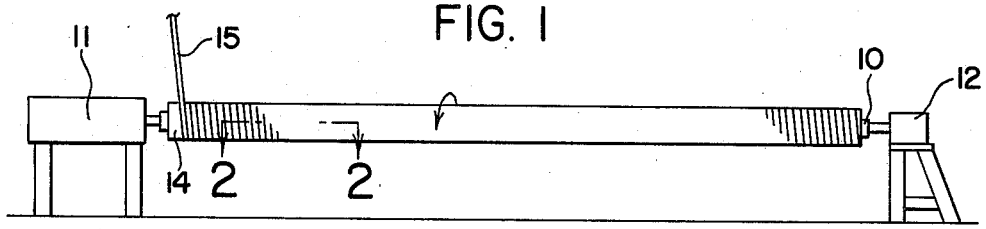
FIG. 1 is an elevational view showing two extruded sleeves of vulcanizable stock of different diameters positioned on a helical forming member and being wrapped from end to end in accordance with the "cording" method aspect of the present invention.

Referring more particularly to the drawings, and initially to FIG. 1, there is shown, in somewhat diagrammatic form, one type of apparatus for making helically corrugated tubing in accordance with the invention. For the purpose of illustration, the method of the invention will be described in detail in connection with a typical "cording" process, although it will be understood that the invention is not limited to the "cording" method but also embraces the "axially extensible external form" method as well.

Figure 6:
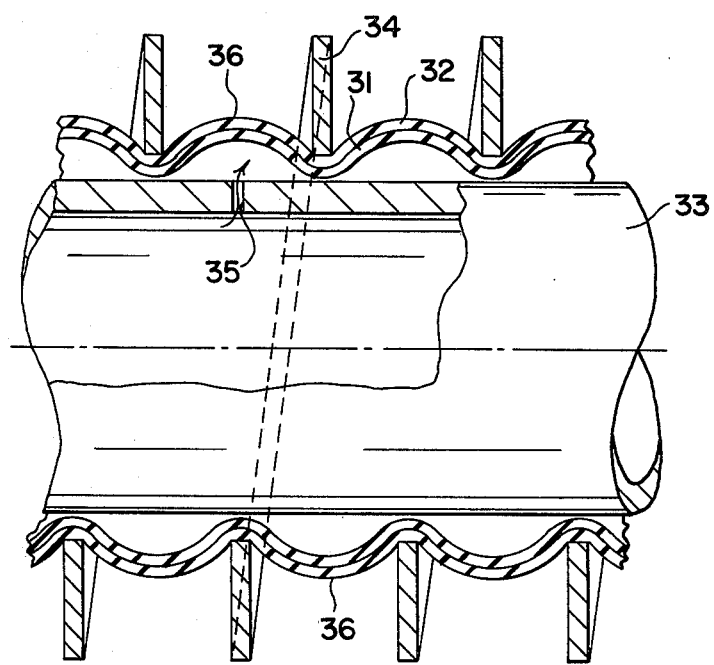
FIG. 6 is a fragmentary, sectional view on an enlarged scale, illustrating the forming of a flexible, helically corrugated length of tubing in accordance with the "axially extensible external form" aspect of the method of the invention, with parts broken away and shown in section for the purpose of illustration.

FIGS. 1 through 5 illustrate the method of the invention using the cording method, and FIG. 6 illustrates tubing being produced in accordance with the "axially extensible external form" method, which will be only briefly described herein.

In accordance with the invention, a length of corrugated tubing is formed from two extruded sleeves of vulcanizable stock which may be of different compositions so as to provide in the finished product an interior surface composition having one set of properties and characteristics and an external surface composition having a different set of properties and characteristics to satisfy the requirements of the particular application.

Figure 2:
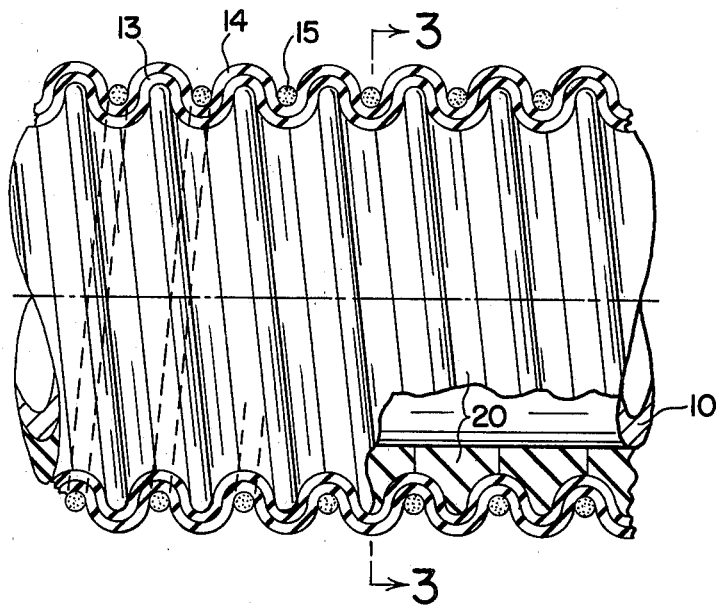
FIG. 2 is a fragmentary, sectional view, on an enlarged scale, taken on the line 2—2 of FIG. 1.

FIG. 1 shows a tubular mandrel 10 mounted at one end in a rotary support 11 that supplies the rotary drive and at the other end in a removable idling rotary support 12. A first extruded sleeve 13 of vulcanizable stock of a particular composition is positioned over the mandrel 10, and immediately thereafter a second extruded sleeve 14 of vulcanizable stock, preferably having a different composition, is slid axially over the first sleeve 13. Then a cord 15 is wrapped around the assembly to press the extruded sleeves 13 and 14 into a helical groove on the mandrel, as best illustrated in FIG. 2. This procedure is illustrated and described in greater detail in U.S. Pat. No. 2,832,096. It will be noted that no lubricant or parting compound is applied between the exterior surface of the sleeve 13 and the interior surface of the sleeve 14 so that the surfaces preferably bond to one another during the subsequent curing operation, or at least so that the surfaces have a high coefficient of friction between them to minimize any tendency to slip or slide relative to one another. When the assembly has been generally formed, as in FIGS. 2 and 3, the mandrel 10, together with the sleeves 13 and 14 and cord 15, are removed from the rotary supports 11 and 12 and placed in a curing oven.

The helical thread on the mandrel 10 for the extruded sleeves 13 and 14 may be formed, for example, by wrapping a strip 20 of relatively hard, flexible rubber around the mandrel 10 to define a single thread of uniform pitch. The core strip 20 has a central ridge that forms the helical crest of the thread and its sides abut one another to define the helical root.

Figure 5:
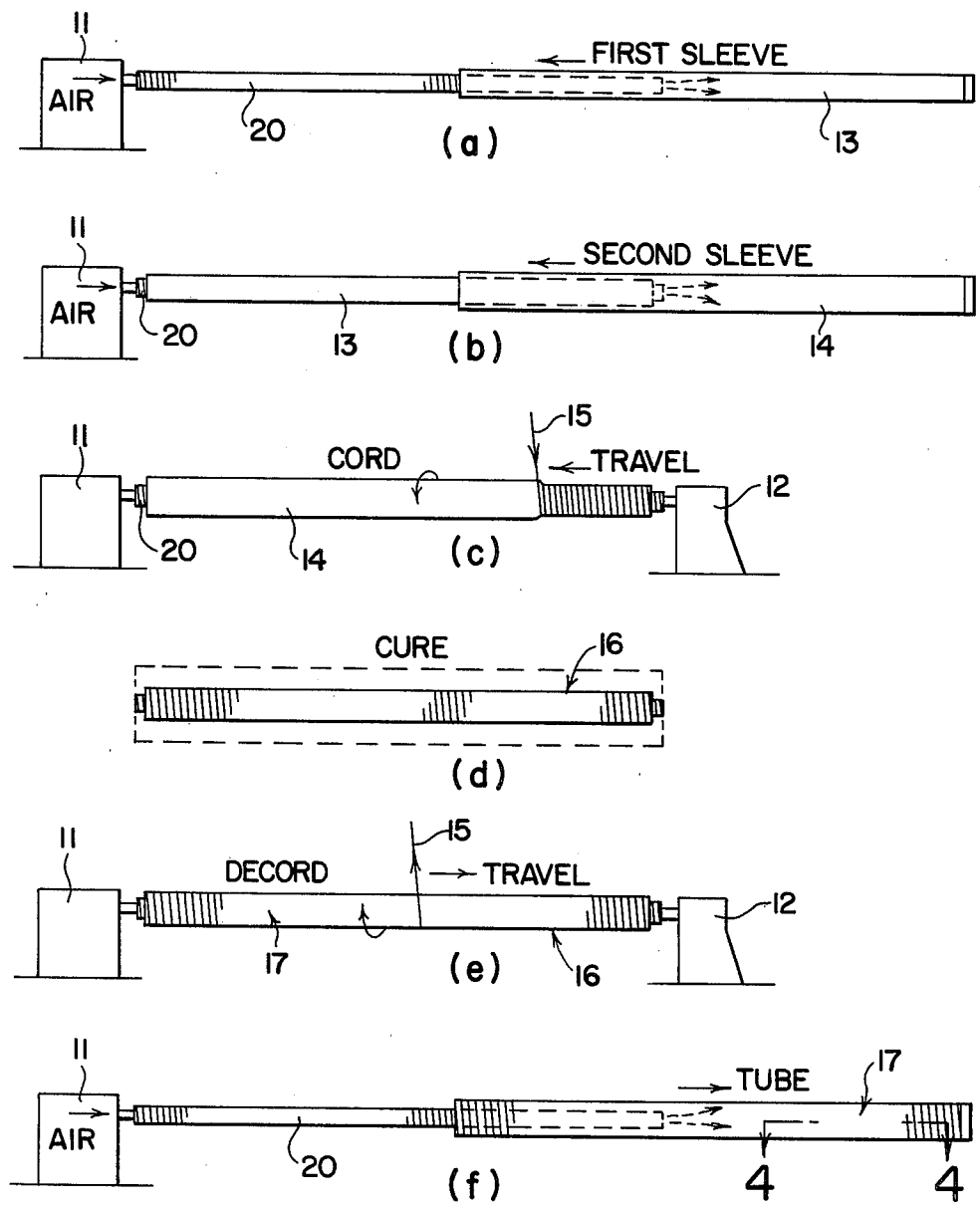
FIG. 5 is a series of elevational views, including views A through F, which illustrate in somewhat diagrammatic form the sequential steps of the method of the invention.

The procedure for forming the flexible, corrugated hose length of dual composition is best illustrated sequentially in FIG. 5. Referring to FIG. 5(a), it will be seen that the first extruded sleeve 13 of vulcanizable stock is slid axially over the assembled mandrel 10 and core strip 20. It will be noted that during the positioning of the sleeves 13 and 14, the mandrel 10 is supported in cantilever fashion by the rotary support 11, and air under pressure to facilitate the sliding of the sleeves in an axial direction is supplied through the rotary support 11.

When the first sleeve 13 is properly positioned on the mandrel, the second sleeve 14, which is of larger diameter (preferably having an internal diameter just slightly larger than the external diameter of the sleeve 13), is slid in an axial direction over the sleeve 13, again using air under pressure as indicated in FIG. 5(b). No lubricant or parting compound is used in this step, but for some purposes it may be desirable to employ a bonding agent that can act initially as a lubricant, but which bonds the sleeves together after the curing step described below has been carried out.

Figure 3:
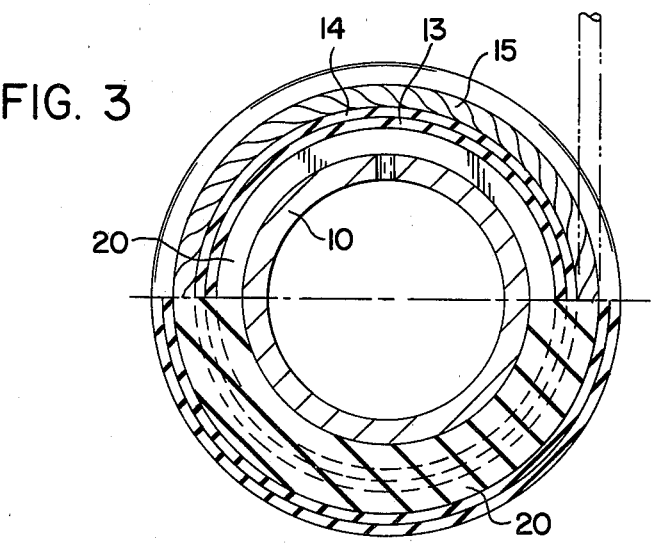
FIG. 3 is a fragmentary, sectional view drawn to the same scale as FIG. 2, and taken on the line 3—3 of FIG. 2.

Once the sleeves 13 and 14 are assembled as shown in FIGS. 5(a) and 5(b), the cord 15 is wrapped around the sleeves as indicated in FIG. 5(c). The cord 15 is wrapped under tension with successive turns thereof in spaced, parallel relation and located in the helical grooves of the mandrel assembly to press adjacent portions of the sleeves 13 and 14 into the grooves in superposed relation, as shown in FIGS. 2 and 3. During the wrapping or "cording" process, the outer end of the mandrel 10 is placed in an idling rotary support 12, and the mandrel is rotated to wind or wrap the cord in a desired fashion.

Once the wrapping is completed, the tail end of the cord 15 is secured to the mandrel 10 and the resulting assembly 16 is removed from the rotary supports 11 and 12 and placed in a curing oven (FIG. 5(d)).

In the curing of the tubing, the tightly wound cord 15 maintains compressive radial forces on the sleeves and, in effect, forms an external mold which confines the rubber during curing. The softening of the rubber sleeves 13 and 14 by the curing heat causes the rubber to flow into and take the shape of the helical groove formed in the mandrel assembly, and also preferably to bond the exterior surface of the sleeve 13 to the interior surface of the sleeve 14. The curing of the rubber while thus confined by the cord results in the formation of a length of corrugated tubing having a dual composition in accordance with the invention.

After the assembly 16 including the cured corrugated tube length 17 is removed from the heat treating oven and cooled, the assembly is placed with the ends of the mandrel 10 supported by the rotary supports 11 and 12, and the mandrel is rotated while the cord 15 is unwrapped from the assembly, as illustrated in FIG. 5(e). When the unwrapping is completed, air under pressure is supplied to the space between the outer surface of the mandrel 10 and the inner surface of the corrugated tube length 17, and the tube is slid axially off the mandrel.

Figure 4:
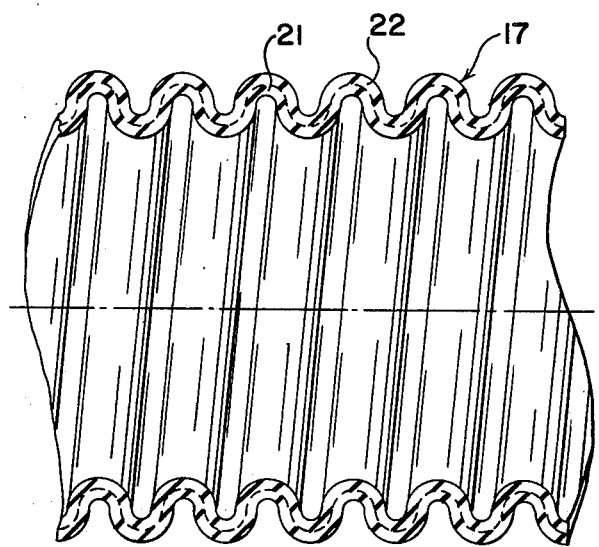
FIG. 4 is a fragmentary, sectional view drawn to the same scale as FIGS. 2 and 3, illustrating the construction of a flexible, helically corrugated tube length of dual composition in accordance with the present invention.

The resulting product produced by the method described is illustrated in cross section in FIG. 4, where it may be seen that the wall of the corrugated tube length has a dual composition and includes an internal layer 21 and an external layer 22. In a typical example, such as where the tubing is to be used for vacuum cleaner hose, the inner layer 21 comprises black neoprene which has a good static conductivity characteristic, and the outer layer comprises gray Hypalon, which is a non-marking composition and thus avoids the undesirable tendency of other compositions to cause streaking or marking of items with which the hose may come into contact.

In another typical application where the tube length is to be used as marine fill hose, the inner layer 21 comprises an acrilo-nitrile composition which has a high oil resistance and the outer layer 22 comprises an E.P.D.M. composition, which has a good ozone resistance.

Thus, the advantage derived from the product produced in accordance with the method of the invention are readily apparent.

FIG. 6 illustrates the principles embodying the method of the invention, but wherein the tubing is made in accordance with the prior art "axially extensible form" method. In accordance with that method, the two extruded sleeves 31 and 32 are superposed on a cylindrical mandrel 33, a helical external form 34 is placed over the sleeves 31 and 32 and air under pressure is introduced through ports 35 in the mandrel 33 to inflate the tube sleeves and form bulges 36 between the convolutions of the helical external forming member 34. Then, the helical forming member 34 is axially collapsed to squeeze the bulges 36 between the convolutions and form embryonic corrugations. The resulting assembly is disassembled by removing the external forming member 34 and the sleeves 31 and 32 simultaneously from the mandrel 33, after which the preformed composite sleeve is placed on a curing mandrel, axially compressed to the desired shape, and cured in a curing oven.

While the method of the invention has been illustrated and described with respect to a specific embodiment thereof, this is intended for the purpose of illustration rather than limitation, and other variations and modifications of the specific methods herein shown and described will be apparent to those skilled in the art, all within the intended spirit and scope of the invention. For example, instead of using only two extruded sleeves in making the tube sections, three or even more sleeves can be employed to provide tube sections with walls made up of three or more layers composed of compositions having characteristic adapted to the service for which the tubing is intended. Accordingly, the patent is not to be limited in scope and effect to the specific embodiment herein shown and described, nor in any other way that is inconsistent with the extent to which the progress in the art has been advanced by the invention.

What is claimed is:

1. A process for making two-ply, flexible, corrugated tubing from at least two extruded sleeves of uncured rubber, including a first sleeve of one diameter and a second sleeve having an inner diameter approximately the same as the outer diameter of said first sleeve,
   positioning said first sleeve of uncured rubber over an elongated internal forming member by sliding said sleeve in an axial direction over said forming member,
   positioning a second sleeve of uncured rubber over said first sleeve by sliding said second sleeve in an axial direction over said first sleeve;
   forming corrugations in said superimposed sleeves and thereby interlocking said sleeves to form a corrugated tubular element, and
   heat-treating said corrugated tubular element to set said corrugations and form a flexible corrugated tube length having a wall having at least two plies.

2. A process according to claim 1 including the additional step of positioning an external corrugation forming member around said superposed sleeves and forming corrugations in said superposed sleeves by expanding said sleeves into engagement with said forming member.

3. A process according to any of claims 1, 2 or 3 wherein the outer surfaces of the inner sleeve is placed in direct contact with the inner surface of the outer sleeve without the interposition of any lubricant or bonding agent.

4. A process as defined in any of claims 1, 2 or 3 wherein said first sleeve has a different composition from said second sleeve.

5. A flexible, corrugated rubber tube made in accordance with the process of claim 4.

6. A flexible, corrugated rubber tube as defined in claim 5, wherein said inner sleeve comprises black "NEOPRENE" rubber and said outer sleeve comprises "HYPALON."

7. A flexible, corrugated, rubber tube as defined in claim 5, wherein said inner sleeve comprises acrilonitrile and said outer sleeve comprises an E.P.D.M. composition.

8. A process for making multiple-ply flexible tubing with corrugations comprising:
   positioning a first uncured rubber sleeve over an elongated internal forming member having a helical surface formed with helical ridges and grooves;

positioning a second uncured rubber sleeve over said first uncured rubber sleeve, wrapping a flexible element about said sleeves under tension with successive turns of said element in spaced, generally parallel relation and in the helical grooves of said internal forming member to press adjacent portions of said sleeves into the groove of said internal forming member in superposed relation;

heat treating said sleeves while in said wrapped superposed condition, to form a two-ply flexible corrugated tube length;

unwrapping said flexible element from said tube length; and introducing air under pressure between said forming member and said multiple-ply tube length and simultaneously sliding said tube length from said internal forming member.

9. A process as defined in claim 8, wherein said first sleeve has a different composition from said second sleeve.

10. A flexible, corrugated rubber tube made in accordance with the process of claim 9.

11. A flexible, corrugated rubber tube as defined in claim 10, wherein said inner sleeve comprises black "NEOPRENE" rubber and said outer sleeve comprises "HYPALON".

12. A flexible, corrugated, rubber tube as defined in claim 11, wherein said inner sleeve comprises acrilonitrile and said outer sleeve comprises an E.P.D.M. composition.

13. A process for making two-ply flexible tubing with corrugations from two extruded sleeves of uncured rubber, comprising the steps of:

positioning a first extruded sleeve of uncured rubber on a forming mandrel by sliding said sleeve in an axial direction over said mandrel, positioning a second extruded sleeve of uncured rubber on said first extruded sleeve of uncured rubber by sliding said sleeve in an axial direction over said mandrel, placing an external forming means around said length to define corrugations, expanding said sleeves radially to form radial bulges between said corrugations, axially foreshortening said sleeves to form embryonic corrugations in said sleeves, thereafter axially extending said sleeves and removing said sleeves from said forming mandrel, thereafter placing said sleeves on a separate curing mandrel in an axially foreshortened corrugated condition, and subjecting said sleeves to heat treatment to retain said corrugations therein.

14. A process as defined in claim 13, wherein said first sleeve has a different composition from said second sleeve.

15. A flexible, corrugated rubber tube made in accordance with the process of claim 14.

16. A flexible, corrugated rubber tube as defined in claim 15, wherein said inner sleeve comprises black "NEOPRENE" rubber and said outer sleeve comprises "HYPALON."

17. A flexible, corrugated, rubber tube as defined in claim 15, wherein said inner sleeve comprises acrilonitrile and said outer sleeve comprises an E.P.D.M. composition.

* * * * *